US012007976B2

(12) United States Patent
Shveidel et al.

(10) Patent No.: US 12,007,976 B2
(45) Date of Patent: Jun. 11, 2024

(54) SYSTEM AND METHOD FOR CONSISTENT METADATA ACCESS BASED ON LOCAL LOCKS SEMANTICS IN A MULTI-NODE CLUSTER

(71) Applicant: EMC IP Holding Company, LLC, Hopkinton, MA (US)

(72) Inventors: Vladimir Shveidel, Pardes-Hana (IL); Bar David, Rishon Lezion (IL); David Bernard, Westford, MA (US); Jason E. Raff, Bedford, NH (US); Shari A. Vietry, Merrimack, NH (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 311 days.

(21) Appl. No.: 17/243,252

(22) Filed: Apr. 28, 2021

(65) Prior Publication Data
US 2022/0350787 A1 Nov. 3, 2022

(51) Int. Cl.
*G06F 16/23* (2019.01)
*G06F 16/172* (2019.01)
(52) U.S. Cl.
CPC ...... *G06F 16/2343* (2019.01); *G06F 16/2379* (2019.01); *G06F 16/172* (2019.01)

(58) Field of Classification Search
CPC ............ G06F 16/2343; G06F 16/2365; G06F 16/2379; G06F 16/2315; G06F 16/172; G06F 16/1435; G06F 11/1435
See application file for complete search history.

(56) References Cited

U.S. PATENT DOCUMENTS

| 11,086,531 | B2 * | 8/2021 | Chheda | ................ | G06F 3/0619 |
| 2016/0179711 | A1 * | 6/2016 | Oikarinen | .............. | G06F 13/18 710/40 |
| 2016/0340357 | A1 * | 11/2016 | Ibrahim | .................. | A61P 25/00 |
| 2016/0350357 | A1 * | 12/2016 | Palmer | ............... | G06F 16/2315 |
| 2019/0377647 | A1 * | 12/2019 | Rao | ....................... | G06F 16/273 |
| 2023/0106982 | A1 * | 4/2023 | David | .................... | G06F 3/067 707/704 |

* cited by examiner

*Primary Examiner* — Marcin R Filipczyk
(74) *Attorney, Agent, or Firm* — Brian J. Colandreo; Heath M. Sargeant; Holland & Knight LLP

(57) ABSTRACT

A method, computer program product, and computer system for acquiring, by a first node, local locks of the first node associated with a metadata log transaction, wherein the first node acquires the local locks of the first node prior to sending a commit message to a second node. The second node may acquire local locks of the second node associated with the metadata log transaction, wherein the second node acquires the local locks of the second node based upon, at least in part, receiving the commit message from the first node.

17 Claims, 4 Drawing Sheets

SYSTEM AND METHOD FOR CONSISTENT METADATA ACCESS BASED ON LOCAL LOCKS SEMANTICS IN A MULTI-NODE CLUSTER

BACKGROUND

Generally, when considering some types of Active-Active storage clusters, the nodes of such clusters should be synchronized to guarantee consistent access/update of the same data and metadata objects from both nodes. The techniques that employ this strategy may limit the overall cluster performance.

BRIEF SUMMARY OF DISCLOSURE

In one example implementation, a method, performed by one or more computing devices, may include but is not limited to acquiring, by a first node, local locks of the first node associated with a metadata log transaction, wherein the first node acquires the local locks of the first node prior to sending a commit message to a second node. The second node may acquire local locks of the second node associated with the metadata log transaction, wherein the second node acquires the local locks of the second node based upon, at least in part, receiving the commit message from the first node.

One or more of the following example features may be included. The local locks of the first node associated with the metadata log transaction may include all metadata pages involved with the metadata log transaction at the first node. The local locks of the second node associated with the metadata log transaction may include all metadata pages involved with the metadata log transaction at the second node. The commit message may include metadata log deltas. The second node may persist the metadata log deltas in a raw data log, update a volatile state of the second node, and release the local locks of the second node associated with the metadata log transaction at the second node. The first node may receive a reply from the second node based upon, at least in part, releasing the local locks of the second node associated with the metadata log transaction, update a volatile state of the first node, and release the local locks of the first node associated with the metadata log transaction at the first node. A shared lock for all the metadata pages involved with the metadata log transaction may be acquired at the first node independently of whether all the metadata pages involved with the metadata log transaction at the first node is a cache hit or cache miss, and an atomic operation on a loading page associated with all the metadata pages involved with the metadata log transaction at the first node may be executed.

In another example implementation, a computing system may include one or more processors and one or more memories configured to perform operations that may include but are not limited to acquiring, by a first node, local locks of the first node associated with a metadata log transaction, wherein the first node acquires the local locks of the first node prior to sending a commit message to a second node. The second node may acquire local locks of the second node associated with the metadata log transaction, wherein the second node acquires the local locks of the second node based upon, at least in part, receiving the commit message from the first node.

One or more of the following example features may be included. The local locks of the first node associated with the metadata log transaction may include all metadata pages involved with the metadata log transaction at the first node. The local locks of the second node associated with the metadata log transaction may include all metadata pages involved with the metadata log transaction at the second node. The commit message may include metadata log deltas. The second node may persist the metadata log deltas in a raw data log, update a volatile state of the second node, and release the local locks of the second node associated with the metadata log transaction at the second node. The first node may receive a reply from the second node based upon, at least in part, releasing the local locks of the second node associated with the metadata log transaction, update a volatile state of the first node, and release the local locks of the first node associated with the metadata log transaction at the first node. A shared lock for all the metadata pages involved with the metadata log transaction may be acquired at the first node independently of whether all the metadata pages involved with the metadata log transaction at the first node is a cache hit or cache miss, and an atomic operation on a loading page associated with all the metadata pages involved with the metadata log transaction at the first node may be executed.

In another example implementation, a computer program product may reside on a computer readable storage medium having a plurality of instructions stored thereon which, when executed across one or more processors, may cause at least a portion of the one or more processors to perform operations that may include but are not limited to acquiring, by a first node, local locks of the first node associated with a metadata log transaction, wherein the first node acquires the local locks of the first node prior to sending a commit message to a second node. The second node may acquire local locks of the second node associated with the metadata log transaction, wherein the second node acquires the local locks of the second node based upon, at least in part, receiving the commit message from the first node.

One or more of the following example features may be included. The local locks of the first node associated with the metadata log transaction may include all metadata pages involved with the metadata log transaction at the first node. The local locks of the second node associated with the metadata log transaction may include all metadata pages involved with the metadata log transaction at the second node. The commit message may include metadata log deltas. The second node may persist the metadata log deltas in a raw data log, update a volatile state of the second node, and release the local locks of the second node associated with the metadata log transaction at the second node. The first node may receive a reply from the second node based upon, at least in part, releasing the local locks of the second node associated with the metadata log transaction, update a volatile state of the first node, and release the local locks of the first node associated with the metadata log transaction at the first node. A shared lock for all the metadata pages involved with the metadata log transaction may be acquired at the first node independently of whether all the metadata pages involved with the metadata log transaction at the first node is a cache hit or cache miss, and an atomic operation on a loading page associated with all the metadata pages involved with the metadata log transaction at the first node may be executed.

The details of one or more example implementations are set forth in the accompanying drawings and the description below. Other possible example features and/or possible example advantages will become apparent from the description, the drawings, and the claims. Some implementations may not have those possible example features and/or pos-

BRIEF DESCRIPTION OF THE DRAWINGS

Like reference symbols in the various drawings indicate like elements.

DETAILED DESCRIPTION

Figure 1:
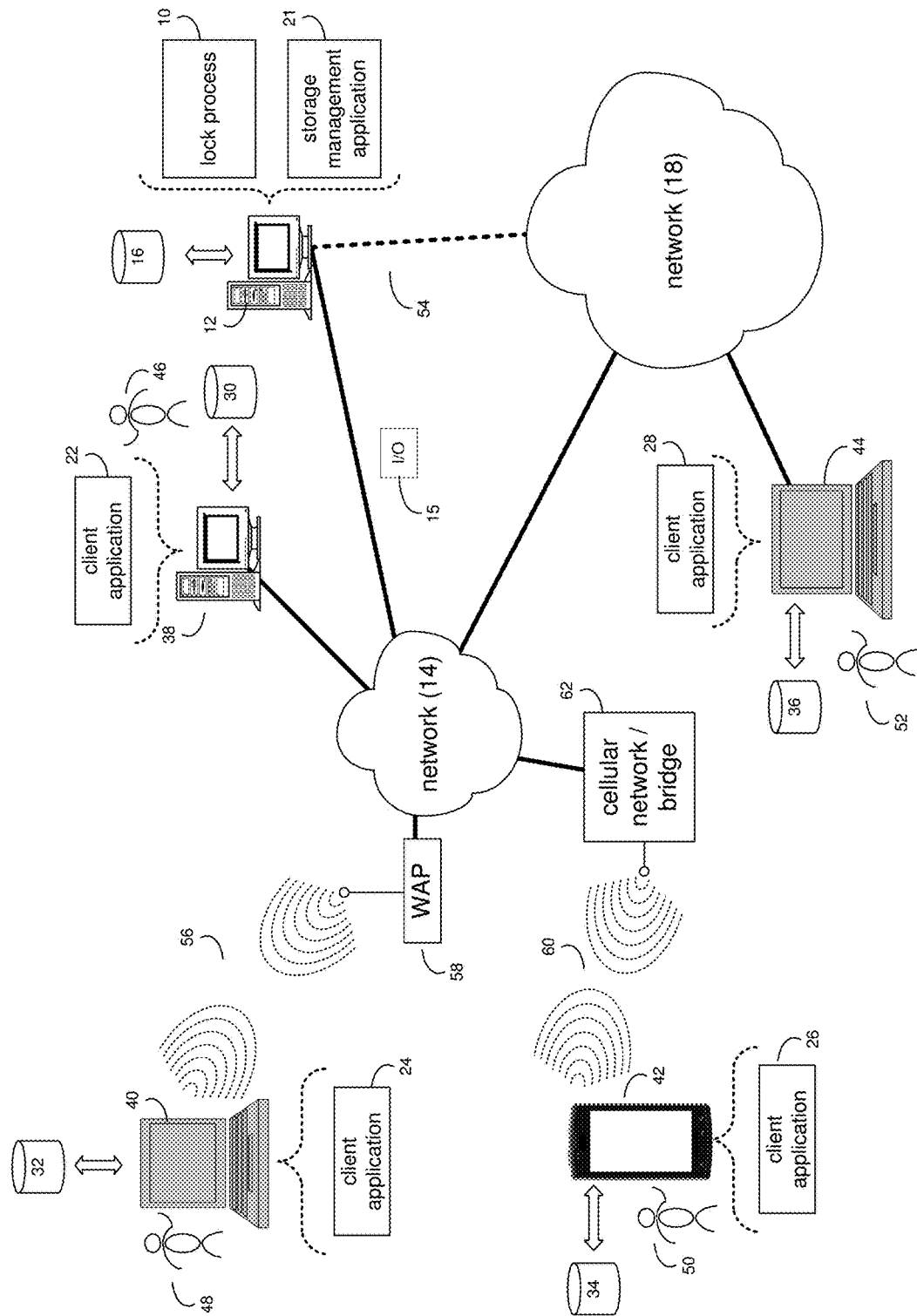
FIG. 1 is an example diagrammatic view of a lock process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown lock process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a lock process, such as lock process 10 of FIG. 1, may acquire, by a first node, local locks of the first node associated with a metadata log transaction, wherein the first node acquires the local locks of the first node prior to sending a commit message to a second node. The second node may acquire local locks of the second node associated with the metadata log transaction, wherein the second node acquires the local locks of the second node based upon, at least in part, receiving the commit message from the first node.

In some implementations, the instruction sets and subroutines of lock process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, lock process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, lock process 10 and/or storage management application 21 may be accessed via one or more of client applications 22, 24, 26, 28. In some implementations, lock process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within lock process 10, a component of lock process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of lock process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of lock process 10 (and vice versa). Accordingly, in some implementations, lock process 10 may be a purely server-side application, a purely client-side application, or a hybrid server-side/client-side application that is cooperatively executed by one or more of client applications 22, 24, 26, 28 and/or lock process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, lock process 10, and storage management application 21, taken singly or in any combination, may effectuate some or all of the same functionality, any description of effectuating such functionality via one or more of client applications 22, 24, 26, 28, lock process 10, storage management application 21, or combination thereof, and any described interaction(s) between one or more of client applications 22, 24, 26, 28, lock process 10, storage management application 21, or combination thereof to effectuate such functionality, should be taken as an example only and not to limit the scope of the disclosure.

In some implementations, one or more of users 46, 48, 50, 52 may access computer 12 and lock process 10 (e.g., using one or more of client electronic devices 38, 40, 42, 44) directly through network 14 or through secondary network 18. Further, computer 12 may be connected to network 14 through secondary network 18, as illustrated with phantom link line 54. Lock process 10 may include one or more user interfaces, such as browsers and textual or graphical user interfaces, through which users 46, 48, 50, 52 may access lock process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24,

26, 28 to, e.g., computer 12. Examples of I/O request 15 may include but are not limited to, data write requests (e.g., a request that content be written to computer 12) and data read requests (e.g., a request that content be read from computer 12).

Figure 2:
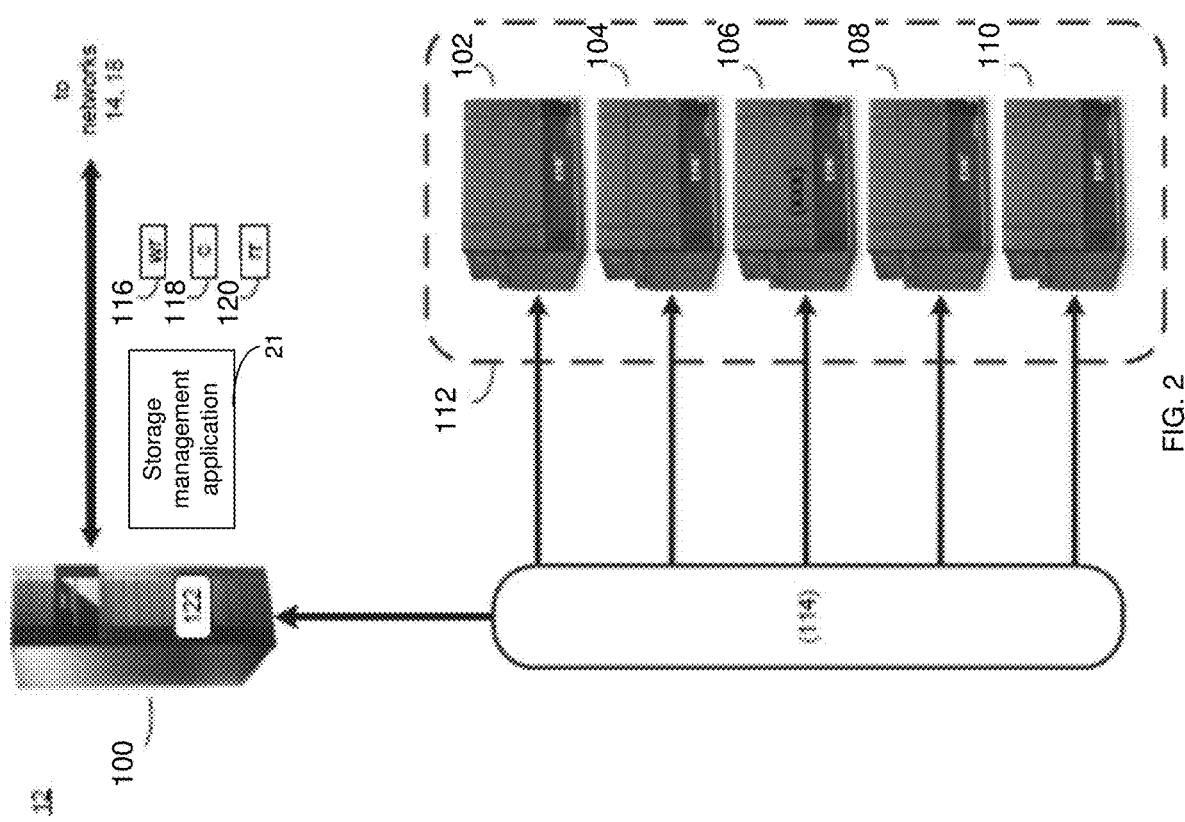
FIG. 2 is an example diagrammatic view of a storage system of FIG. 1 according to one or more example implementations of the disclosure.
Figure 3:
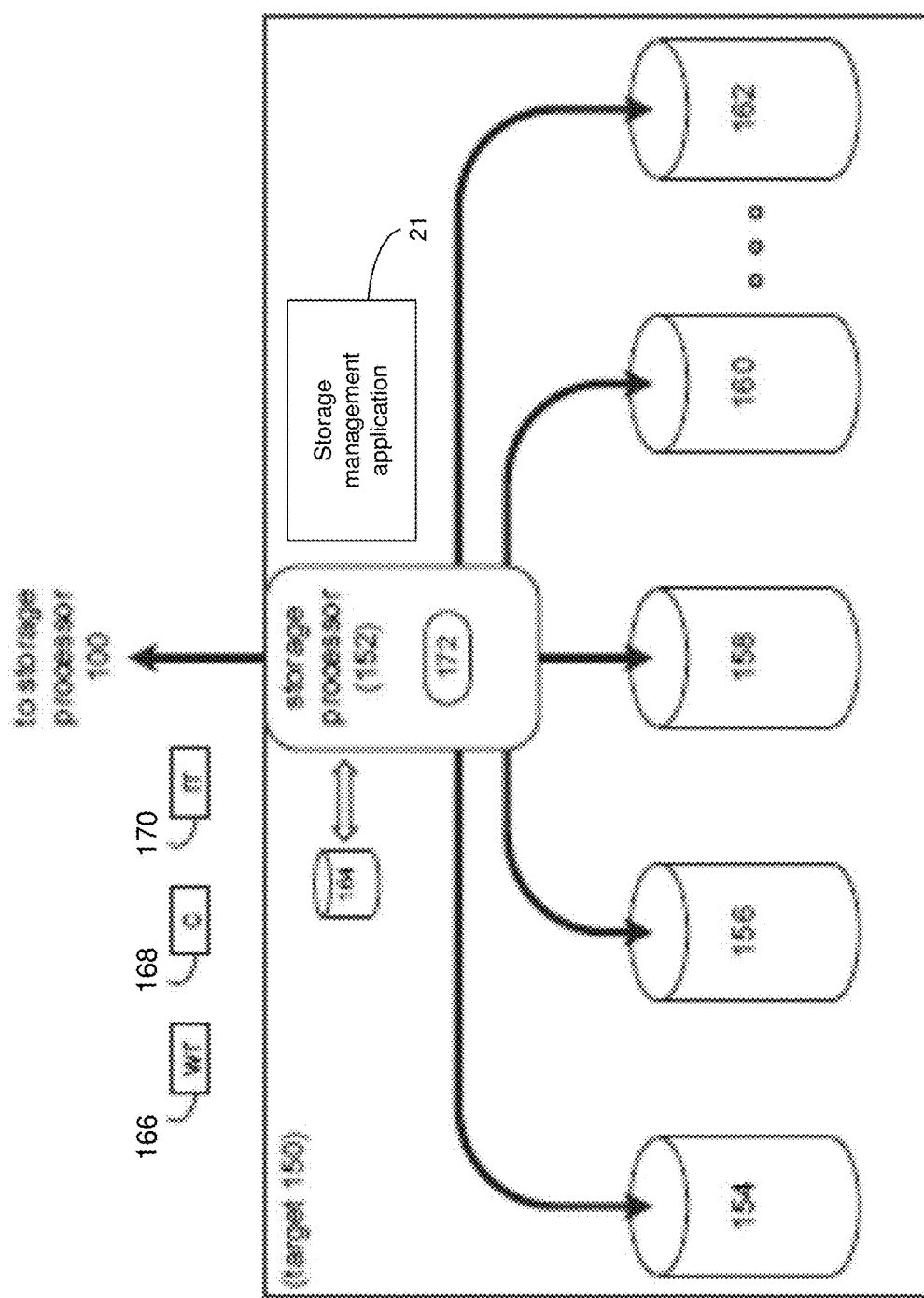
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or lock process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Generally, when considering some types of Active-Active storage clusters, the nodes of such clusters should be synchronized to guarantee consistent access/update of the same data and metadata objects from both nodes. Specifically, for the metadata (MD) pages, the typical MD update looks as follows.

Initiator: Acquire "exclusive" locks for all MD pages involved in the transaction (where the lock is "global", so the lock state on both nodes should be synched, so in general it requires a ICS exchange between nodes to synchronize the state of the locks).

Initiator: Begin Committing the update, make volatile updates on the Initiator node, send the commit message (containing updates, such as the metadata log (MDL) deltas) to the peer.

Peer: Committing update. persist the updates (e.g., write to raw data log (RDL), update the volatile structures, and send a reply to the Peer.

Initiator: Upon receiving the reply from the Peer, finalize the commit, and release all MD page locks (lock release does not require an additional exchange when optimized).

This scheme provides MD consistency/integrity, since locking semantics is global (for both nodes) and so the entire commit flow is inside a protected (by lock) section, that guarantees correct MD exclusive/shared access semantics and serialization on both nodes. So, the only responsibility of "commit" logics is providing transactions consistency (e.g., rollback/rollforward) in case of a restart. The main example drawback of this approach is that it may require two internode exchanges in a general case (e.g., one for acquiring locks and one for commit/update synchronization). Additionally, it may require a lot of resources (e.g., CPU, network bandwidth, etc.). Additionally, it may increase a contention of the lock, since the protected section of the code is "end-to-end" i.e., rather long. Additionally, it may increase MD update operation latency. All the above drawbacks essentially limit the overall cluster performance. Therefore, as will be discussed below, the present disclosure involves a more efficient "local" MD page lock semantics/schema. Since the update itself (e.g., specifically MDL deltas) should be coherent between nodes anyway, the present disclosure may modify the locking schema and make the lock semantic to be "local". Specifically, the Initiator and Peer may acquire local locks (local to their respective node) separately, with no dedicated internode lock synchronization.

Figure 4:
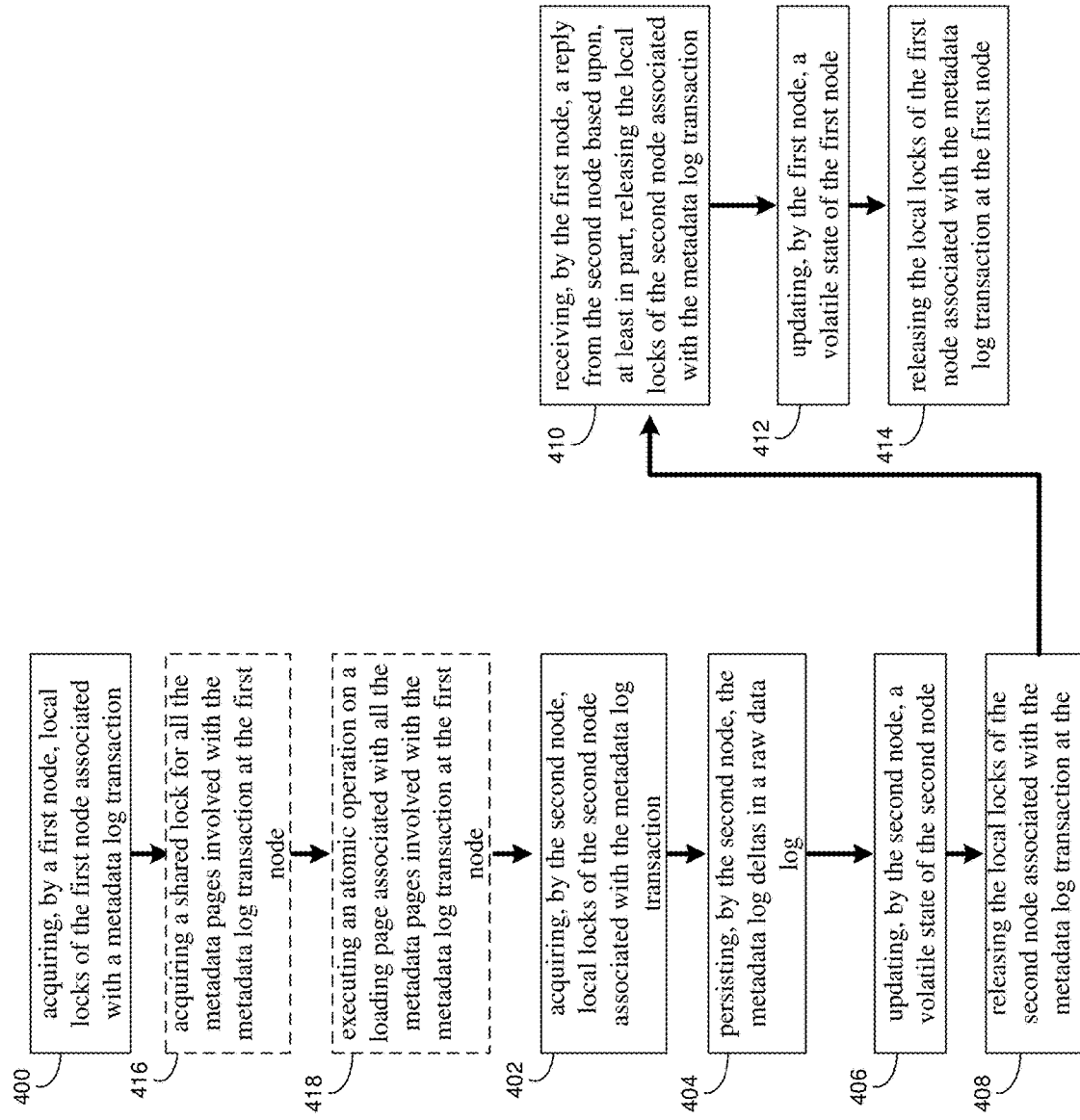
FIG. 4 is an example flowchart of a lock process according to one or more example implementations of the disclosure.

The Lock Process:

As discussed above and referring also at least to the example implementations of FIG. 4, lock process 10 may acquire 400, by a first node, local locks of the first node associated with a metadata log transaction, wherein the first node acquires the local locks of the first node prior to sending a commit message to a second node. Lock process 10 may acquire 402, by the second node, local locks of the second node associated with the metadata log transaction, wherein the second node acquires the local locks of the second node based upon, at least in part, receiving the commit message from the first node.

In some implementations, lock process 10 may acquire 400, by a first node, local locks of the first node associated with a metadata log transaction, wherein the first node acquires the local locks of the first node prior to sending a commit message to a second node. For instance, as will be discussed below, a first node (referred to herein interchangeably as the Initiator node) may take its (local) locks before sending a commit message to the second node. In some implementations, lock process 10 may acquire 402, by the second node, local locks of the second node associated with the metadata log transaction, wherein the second node acquires the local locks of the second node based upon, at least in part, receiving the commit message from the first node. For instance, as will also be discussed below, a second node (referred to herein interchangeably as the Peer node) may take its (local) locks once the Peer node receives the commit message from Initiator (i.e., the Peer node handles it as a local request). Advantageously, no global (internode) locks are acquired before metadata (MD) commit for either node, and the MD locks have exclusively local meaning. That is, read/write lock semantics and serialization are provided in the scope of the respective local node only.

In some implementations, the local locks of the first node associated with the metadata log transaction may include all metadata pages involved with the metadata log transaction at the first node. For example, the Initiator node may acquire 400 local locks for all MD pages involved with the metadata log (MDL) transaction (the MDL transaction for updating data). Notably, since at this point, any node trying to access those MD pages on this particular node (i.e., the Initiator node) will be serialized (i.e., will wait until the lock is released).

In some implementations, the commit message may include metadata log deltas. For example, the Initiator node may send a commit message (that includes the update data itself, such as the MDL deltas associated with the update).

In some implementations, the local locks of the second node associated with the metadata log transaction may include all metadata pages involved with the metadata log transaction at the second node. For example, similar to the Initiator node, the Peer node (upon receiving the commit message sent from the Initiator node), may acquire 402 its local locks for all MD pages involved in the MDL transaction (the MDL transaction for updating data). Notably, since at this point, any node trying to access those MD pages on this particular node (i.e., the Peer node) will be serialized (i.e., will wait until the lock is released).

In some implementations, there may be a need to prevent so called "deadlocking". For example, in a general scenario, some MD page may be "concurrently" updated from both nodes, i.e., both nodes concurrently initiate an update. Potentially, such a situation may cause a deadlock, since both nodes are sending commit messages and cannot acquire locks on the Peer (since the Peer is locked by its own initiated request). This is not a new problem; however, any prevention method applied in a previous solution may be applied here as well. Specifically, lock process 10 may break node symmetry (e.g., by granting permanent higher priority for one node or based on some match function from a logical block address (LBA)) and aborting the transaction on the lower priority node. Alternatively, lock process 10 may enforce a dedicated ICS RPC protocol for resolution.

Once a "winner" and "loser" node are determined, the concurrent update may be resolved as follows by lock process 10, e.g.: if the Initiator is the "winner", then the regular processing is done (i.e., update is continued despite exclusive lock request issued by the Initiator node and sent to another node). If the Initiator node is a "loser", then the request may be aborted, and a NAK/Abort may be sent to the Initiator node. When the Initiator node receives NAK/Abort, it may release all locks and retry the update/transaction from the beginning (i.e., rebuild the delta sets based on the current/updated state of the MD). Thus, in some implementations, lock process 10 may allow consistent/coherent handling of concurrent updates from two nodes and may guarantee progress (no live locks), since at list one of two concurrent updated requests is always completed.

In some implementations, lock process 10 (e.g., via the second node) may persist 404 the metadata log deltas in a raw data log, update 406 a volatile state of the second node, and release 408 the local locks of the second node associated with the metadata log transaction at the second node. For example, the Peer node may persist 404 the updates (e.g., in the raw data log (RDL)) and may update 406 its volatile state. After this update, the Peer node may release 408 (locally) all the acquired MD locks. At this point, new updated data is visible and accessible from this node (i.e., the Peer node), while from the Initiator node it is still not accessible (the lock is still active on the Initiator node). This is completely OK, since the lock on the Initiator node prevents reading the old data on the Initiator. As such, semantically, both nodes are always seeing the same data. Once released, the Peer node may send a reply to the Initiator node acknowledging that the Peer node has completed its update locally.

In some implementations, lock process 10 (e.g., via the first node) may receive 410 a reply from the second node based upon, at least in part, releasing the local locks of the second node associated with the metadata log transaction, update 412 a volatile state of the first node, and release 414 the local locks of the first node associated with the metadata log transaction at the first node. For example, the Initiator node, upon receiving 410 the above-noted reply from the Peer node, may update 412 the volatile structures (e.g., TxCache, HBSB, etc.), and may release 414 all its acquired (local) locks associated with the metadata log transaction. At this point, new updated data is visible and accessible from this node (i.e., the Initiator node) as well.

In some implementations, lock process 10 may (optionally) acquire 416 a shared lock for all the metadata pages involved with the metadata log transaction at the first node independently of whether all the metadata pages involved with the metadata log transaction at the first node is a cache hit or cache miss, and may (optionally) execute 418 an atomic operation on a loading page associated with all the metadata pages involved with the metadata log transaction at the first node. For example, the read flow, generally, has lock process 10 acquire just the local read/shared lock for the MD page. In some storage system implementations, where a lock protects the TxCache page (that may be either loaded/existed, or not)—an exclusive lock may be applied also in a read ("read miss") flow to prevent two threads loading the same MD page in the TxCache concurrently (e.g., if it is assumed that the TxCache page is a protecting object, then loading the page to the TxCache has write semantics). Despite this, the semantics may be generally preserved also with the disclosed "local" locking scheme, where even with some storage systems, lock process 10 may acquire a shared lock for the MD page (independently whether the page is cache "hit" or "miss") to avoid concurrent loading, and thus lock process 10 may protect the "loading page" critical section with mutex (atomic CAS operation). As such, the first loader may actually perform the loading, while all the later loaders may get an indication (e.g., as a return code from CAS) that loading is already "in progress" and may just wait until the page is loaded. It is the responsibility of the "first" actual loader to notify all the waiting loaders when it is done.

Advantageously, consistency and coherency may be proven with the disclosed technique. For example, since the Initiator node holds the local locks for all MD pages from the beginning of the MD commit until its completion—any access from the Initiator node to those pages during the commit may be delayed until update completion. So, any other IO request either will see the old data (before the commit starts) or see the new data (after the commit is completed) or wait for the commit completion. That is, the Initiator behavior/view is correct. Moreover, the Peer node acquires the (local) locks after receiving the commit message and releases them after completion of persistent (to the RDL) and volatile structure (TxCache/HBSB) update. That is, when the transaction is considered done (i.e., in case of a restart it is rollback-ed) so any other IO request on the Peer node may either see old pages (before beginning the commit), or wait (until the Peer node is done with the commit), or see new pages (after the Peer commit is done). That is, the Peer node view is also correct.

Thus, before the commit began: both Initiator and Peer see the old data. The time interval between when the commit began (on the Initiator node) and receiving the commit message (by the Peer node), the initiator has no access to locked data, and the Peer node sees the old data. During the time interval when the Peer Node is processing the commit, both nodes have no access to the locked data. Notably, all the transactional logic associated with processing the commit is made in this time interval). The time interval between when the commit is done (on the Peer) and when the commit is completed (on the Initiator), the Initiator node has no access to the locked data, and the Peer node sees the new data. After the commit is completed (on both nodes), both Initiator and Peer nodes see the new data. As such, the view of both nodes is coherent and consistent, just the critical section for the Peer Node is shorter (i.e., it continues to see the old data when the Initiator is already locked and it begins to see the new data earlier when the Initiator is still locked.

In some implementations, some storage systems may have a "bulk update"—when an entire MD page is updated. Updated data for this type of update (unlike a delta update) is not transferred as part of a commit message, however, the reference to the page (LBA) is transferred. Thus, semantically, the "bulk" update on the Peer node is just invalidation of the volatile copy of the page (instead of real updating)—it forces the reader to reread the updated page either from NVRAM/TxArea (if the page is not still settled in the MD store) or from the MD store (if the transaction is completed). To separate the cases above, lock process 10 may keep the current Transaction ID and reference to TxArea TxCache metadata (or local lock object).

Therefore, the present disclosure provides an improved storage system that may: decrease the number of inter-node synchronization requests (e.g., by combining MD lock and commit logics), decrease the quantity of resources (e.g., CPU/cpb, network bandwidth, etc.) required for MD processing, reduce latency of MD operations, reduce lock contention as a result of shortening the protected section. All the above allows the present disclosure essentially to improve cluster performance.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:
1. A computer-implemented method, executed on a computing device, comprising:
    acquiring, by a first node, local locks of the first node associated with a metadata log transaction, wherein the first node acquires the local locks of the first node prior to sending a commit message to a second node;

acquiring, by the second node, local locks of the second node associated with the metadata log transaction, wherein the second node acquires the local locks of the second node based upon, at least in part, receiving the commit message from the first node;

acquiring a shared lock for all metadata pages involved with the metadata log transaction at the first node independently of whether all the metadata pages involved with the metadata log transaction at the first node is a cache hit or cache miss to avoid concurrent loading a same metadata page; and executing an atomic operation on a loading page associated with all the metadata pages involved with the metadata log transaction at the first node, wherein during a first time interval between when a metadata commit began on the first node and when the commit message is received by the second node, the first node has no access to locked data, and the second node sees old data, wherein during a second time interval when the second node is processing the metadata commit based upon, at least in part, the received commit message, both the first node and the second node have no access to the locked data, and wherein during a third time interval between when the metadata commit being done on the second node and when the metadata commit is completed on the first node, the first node has no access to the locked data, and the second node sees new data.

2. The computer-implemented method of claim 1 wherein the local locks of the first node associated with the metadata log transaction include all the metadata pages involved with the metadata log transaction at the first node.

3. The computer-implemented method of claim 2 wherein the local locks of the second node associated with the metadata log transaction include all the metadata pages involved with the metadata log transaction at the second node.

4. The computer-implemented method of claim 1 wherein the commit message includes metadata log deltas.

5. The computer-implemented method of claim 4 further comprising:
   persisting, by the second node, the metadata log deltas in a raw data log;
   updating, by the second node, a volatile state of the second node; and
   releasing the local locks of the second node associated with the metadata log transaction at the second node.

6. The computer-implemented method of claim 5 further comprising:
   receiving, by the first node, a reply from the second node based upon, at least in part, releasing the local locks of the second node associated with the metadata log transaction;
   updating, by the first node, a volatile state of the first node; and
   releasing the local locks of the first node associated with the metadata log transaction at the first node.

7. A computer program product residing on a non-transitory computer readable storage medium having a plurality of instructions stored thereon which, when executed across one or more processors, causes at least a portion of the one or more processors to perform operations comprising:
   acquiring, by a first node, local locks of the first node associated with a metadata log transaction, wherein the first node acquires the local locks of the first node prior to sending a commit message to a second node;
   acquiring, by the second node, local locks of the second node associated with the metadata log transaction, wherein the second node acquires the local locks of the second node based upon, at least in part, receiving the commit message from the first node;
   acquiring a shared lock for all metadata pages involved with the metadata log transaction at the first node independently of whether all the metadata pages involved with the metadata log transaction at the first node is a cache hit or cache miss to avoid concurrent loading a same metadata page; and
   executing an atomic operation on a loading page associated with all the metadata pages involved with the metadata log transaction at the first node,
   wherein during a first time interval between when a metadata commit began on the first node and when the commit message is received by the second node, the first node has no access to locked data, and the second node sees old data,
   wherein during a second time interval when the second node is processing the metadata commit based upon, at least in part, the received commit message, both the first node and the second node have no access to the locked data, and
   wherein during a third time interval between when the metadata commit being done on the second node and when the metadata commit is completed on the first node, the first node has no access to the locked data, and the second node sees new data.

8. The computer program product of claim 7 wherein the local locks of the first node associated with the metadata log transaction include all the metadata pages involved with the metadata log transaction at the first node.

9. The computer program product of claim 8 wherein the local locks of the second node associated with the metadata log transaction include all the metadata pages involved with the metadata log transaction at the second node.

10. The computer program product of claim 7 wherein the commit message includes metadata log deltas.

11. The computer program product of claim 10 wherein the operations further comprise:
    persisting, by the second node, the metadata log deltas in a raw data log;
    updating, by the second node, a volatile state of the second node; and
    releasing the local locks of the second node associated with the metadata log transaction at the second node.

12. The computer program product of claim 11 wherein the operations further comprise:
    receiving, by the first node, a reply from the second node based upon, at least in part, releasing the local locks of the second node associated with the metadata log transaction;
    updating, by the first node, a volatile state of the first node; and
    releasing the local locks of the first node associated with the metadata log transaction at the first node.

13. A computing system including one or more processors and one or more memories configured to perform operations comprising:
    acquiring, by a first node, local locks of the first node associated with a metadata log transaction, wherein the first node acquires the local locks of the first node prior to sending a commit message to a second node;
    acquiring, by the second node, local locks of the second node associated with the metadata log transaction, wherein the second node acquires the local locks of the second node based upon, at least in part, receiving the commit message from the first node;

acquiring a shared lock for all metadata pages involved with the metadata log transaction at the first node independently of whether all the metadata pages involved with the metadata log transaction at the first node is a cache hit or cache miss to avoid concurrent loading a same metadata page; and executing an atomic operation on a loading page associated with all the metadata pages involved with the metadata log transaction at the first node, wherein during a first time interval between when a metadata commit began on the first node and when the commit message is received by the second node, the first node has no access to locked data, and the second node sees old data, wherein during a second time interval when the second node is processing the metadata commit based upon, at least in part, the received commit message, both the first node and the second node have no access to the locked data, and wherein during a third time interval between when the metadata commit being done on the second node and when the metadata commit is completed on the first node, the first node has no access to the locked data, and the second node sees new data.

14. The computing system of claim 13 wherein the local locks of the first node associated with the metadata log transaction include all the metadata pages involved with the metadata log transaction at the first node, and wherein the local locks of the second node associated with the metadata log transaction include all the metadata pages involved with the metadata log transaction at the second node.

15. The computing system of claim 13 wherein the commit message includes metadata log deltas.

16. The computing system of claim 15 wherein the operations further comprise:

persisting, by the second node, the metadata log deltas in a raw data log;

updating, by the second node, a volatile state of the second node; and releasing the local locks of the second node associated with the metadata log transaction at the second node.

17. The computing system of claim 16 wherein the operations further comprise:

receiving, by the first node, a reply from the second node based upon, at least in part, releasing the local locks of the second node associated with the metadata log transaction;

updating, by the first node, a volatile state of the first node; and releasing the local locks of the first node associated with the metadata log transaction at the first node.

* * * * *